(12) United States Patent (10) Patent No.: US 7,272,789 B2
O'Brien (45) Date of Patent: Sep. 18, 2007

(54) METHOD OF FORMATTING DOCUMENTS

(75) Inventor: Stephen O'Brien, Palmwoods (AU)

(73) Assignee: Typefi Systems Pty. Ltd., Peregian Beach Qld. (AU)

(*) Notice: Subject to any disclaimer, the term of this patent is extended or adjusted under 35 U.S.C. 154(b) by 300 days.

(21) Appl. No.: 10/717,145

(22) Filed: Nov. 18, 2003

(65) Prior Publication Data

US 2004/0194028 A1 Sep. 30, 2004

(30) Foreign Application Priority Data

Nov. 18, 2002 (AU) .............................. 2002952711

(51) Int. Cl.
*G06F 17/21* (2006.01)
(52) U.S. Cl. ...................................................... 715/517
(58) Field of Classification Search ................ 715/517, 715/520
See application file for complete search history.

(56) References Cited

U.S. PATENT DOCUMENTS

| | | | | |
|---|---|---|---|---|
| 4,949,287 | A * | 8/1990 | Yamaguchi et al. | ........ 715/520 |
| 5,144,555 | A * | 9/1992 | Takadachi et al. | ........... 715/530 |
| 5,197,122 | A * | 3/1993 | Miyoshi et al. | ............. 715/530 |
| 5,214,755 | A * | 5/1993 | Mason | ....................... 715/520 |
| 5,517,621 | A * | 5/1996 | Fukui et al. | ................. 715/517 |
| 5,553,217 | A | 9/1996 | Hart et al. | |
| 5,911,146 | A | 6/1999 | Johari | |
| 5,926,825 | A | 7/1999 | Shirakawa | |
| 6,026,417 | A | 2/2000 | Ross et al. | |
| 6,038,567 | A | 3/2000 | Young | |
| 6,205,452 | B1 | 3/2001 | Warmus et al. | |
| 6,327,599 | B1 | 12/2001 | Warmus et al. | |
| 6,366,918 | B1 | 4/2002 | Guttman et al. | |
| 6,584,480 | B1 | 6/2003 | Ferrel et al. | |
| 6,844,940 | B2 | 1/2005 | Warmus et al. | |
| 6,952,801 | B2 | 10/2005 | Warmus et al. | |
| 2002/0040373 | A1 | 4/2002 | Wichert et al. | |
| 2002/0040375 | A1* | 4/2002 | Simon et al. | ................ 707/517 |
| 2002/0095439 | A1 | 7/2002 | Long et al. | |
| 2002/0122067 | A1 | 9/2002 | Geigel et al. | |
| 2004/0001099 | A1 | 1/2004 | Reynar et al. | |
| 2004/0205454 | A1* | 10/2004 | Gansky et al. | ............... 715/500 |

FOREIGN PATENT DOCUMENTS

| | | |
|---|---|---|
| EP | 0 844 573 A3 | 5/1998 |
| EP | 0 860 797 A2 | 8/1998 |

OTHER PUBLICATIONS

Jacobs et al.; Adaptive Document Layout via Manifold Content; pp. 25-28.*
Seehof et al;Automated Facilities Layout Programs; ACM; 1966; pp. 191-199.*
Jacobs, Charles, et al.; "Adaptive Document Layout via Manifold Content," Second International Workshop of Web Document Analysis in Edinburgh, UK; Aug. 3, 2003.*

* cited by examiner

*Primary Examiner*—Doug Hutton
(74) *Attorney, Agent, or Firm*—Vierra Magen Marcus & DeNiro LLP

(57) ABSTRACT

The present invention provides a method of preparing content with design in a presentation that is suitable for printing and/or electronic publishing. The method utilizes content data including alphanumeric and/or graphical elements, and design data including a rule or rules associated with a particular alphanumeric element or graphical element. This can be used to define a scoring system which defines a score dependent on a degree of conformance of layouts to the rules, with the layout being selected in accordance with the resulting score.

25 Claims, 11 Drawing Sheets

Sidebar {Ch#}.{Sb#}: [sbHead] – [sbText]|r

Sidebar 2.3: Automatic File Opening – You can set Windows to automatically open your accounting data file when you launch the software. For details, see *Automatically Opening Your Data at Start-up* later in this chapter.

| | ☐ Repeat Horiz | ☑ Repeat Horiz |
|---|---|---|
| Repeat Vert ☐ | TOTAL SALES | Period |
| Repeat Vert ☑ | [Region] | [Amount] |

In this table the second column is set to repeat horizontally and the second row set to repeat vertically. The number of repeats is driven by the number of rows and columns in the submitted manuscript.

FIGURE 10a

| TOTAL SALES | Q1 | Q2 | Q3 | Q4 |
|---|---|---|---|---|
| East | 20,000 | 30,000 | 25,500 | 28,600 |
| South | 30,200 | 38,000 | 29,500 | 31,300 |
| North | 26,000 | 25,500 | 30,000 | 28,600 |
| West | 38,000 | 25,500 | 29,500 | 30,200 |

This table was created using the format described in FIGURE 10a.
It has been automatically expanded to include any number of repeating columns and rows.

FIGURE 10b

| | ☐ Repeat Horiz | ☑ Repeat Horiz | ☑ Repeat Horiz |
|---|---|---|---|
| Repeat Vert ☐ | TOTAL SALES | Period | Period |
| Repeat Vert ☑ | [Region] | [Amount] | [Amount] |

In this table a second repeating column is used to define a repeating alternating pattern. The number of columns drawn is determined by the manuscript data and the second column won't be drawn on the page unless required.

FIGURE 11a

| TOTAL SALES | Q1 | Q2 | Q3 | Q4 |
|---|---|---|---|---|
| East | 20,000 | 30,000 | 25,500 | 28,600 |
| South | 30,200 | 38,000 | 29,500 | 31,300 |
| North | 26,000 | 25,500 | 30,000 | 28,600 |
| West | 38,000 | 25,500 | 29,500 | 30,200 |

This table was created using the format described in Fig a. It has been automatically expanded to include any number of repeating columns and rows.

FIGURE 11b

|  | ☐ Repeat Horiz | ☑ Repeat Horiz | ☑ Repeat Horiz |
|---|---|---|---|
| Repeat Vert ☐ | TOTAL SALES | Period | Period |
| Repeat Vert ☑ | [Region] | [Amount] | [Amount] |
| Repeat Vert ☑ | [Region] | [Amount] | [Amount] |

In this table a second repeating row is added to the definition shown in Figure 11a, achieving a more complex alternating pattern. Any number of repeating rows and columns may be defined. It isn't a requirement that each alternating pattern equal a complete instance of that pattern as shown in Figure 11b.

FIGURE 11c

| TOTAL SALES | Q1 | Q2 | Q3 |
|---|---|---|---|
| East | 20,000 | 30,000 | 25,500 |
| South | 30,200 | 38,000 | 29,500 |
| North | 26,000 | 25,500 | 30,000 |
| West | 38,000 | 25,500 | 29,500 |

This table was created using the format described in Figure 11c and is comprised of alternating columns and rows. The pattern was repeated 1.5x horizontally and 2x vertically.

FIGURE 11d

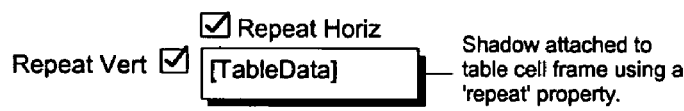

A simple table definition where a background shadow frame is linked to the table cell.

FIGURE 12a

| [TableData] | [TableData] | [TableData] |
|---|---|---|
| [TableData] | [TableData] | [TableData] |

When linked to repeat 'on every' the background frame appears behind every table cell.

FIGURE 12b

When linked to as a 'span' the background frame stretched from the top-left corner of the first instance of the table cell, to the lower-right corner of the last instance of the table cell.

Counter frame replicates and increments on each instance of the callout frame.

METHOD OF FORMATTING DOCUMENTS

PRIORITY APPLICATION

The present application claims priority of Australian Provisional Patent Application No. 2002952711, entitled "A Method Of Formatting Documents," filed Nov. 18, 2002 in Australia.

BACKGROUND OF THE INVENTION

1. Field of the Invention

The present invention is directed to an automated method of preparing content with design in a presentation that is suitable for printing and/or electronic publishing.

2. Description of the Related Art

The reference to any prior art in this specification is not, and should not be taken as, an acknowledgment or any form of suggestion that the prior art forms part of the common general knowledge.

Most document production is achieved without using any kind of structure or automation. In order to improve the efficiency of the document production process varying degrees of automation are available. Current electronic typesetting and document layout and publishing systems for printing and/or electronic publishing offer automation features that utilize different types of data to produce a completed work. The content is generally produced separately from the design or stylistic content which gives the finished work a particular appearance. This appearance may be common to a group of works across a series, lending the series a consistent format that is often designed to appeal to potential purchasers.

The creator of the content, hereinafter called the content creator, writes the text of the work. A particular work may also require the production of other material such as drawings and other graphical figures. These may be created or prepared by the content creator, who may be a content creator preparing the written content, or by another content creator such as a technical illustrator or an artist. The raw text and other material are hereinafter termed the content and are not necessarily formatted for the final appearance of the work.

The stylistic appearance is generally controlled by a graphic, document or Web designer. The designer is charged with the task of creating an aesthetically pleasing or efficient design that may be intended either for print or for electronic publishing in page form or in some other geometric space. We will henceforth refer to the output of the design as a partial page, a full page or a series of pages, although it may include other display spaces such as computer monitors or other display devices.

The designer typically prepares sample pages and/or produces written guidelines which dictate the finished appearance of the work. The sample pages and guidelines may be created using a known desktop publishing software package such as Adobe PageMaker, Adobe InDesign or QuarkXPress, Web page content creation software, or recorded using a word-processing system or other data-processing system. The stylistic information is hereinafter called the design.

Once the design has been approved, and the content has been completed, both are sent to an operator who prepares the presentation of the work by manually combining the content with the design and layout rules specified in the design. The process is a manually-intensive one, with scope for error and misunderstanding. A typical work such as a reference book containing several hundred pages may have a fairly complex layout including sidebars, drawings, photographs, graphs and tables, and may take an operator from several weeks to several months to prepare manually.

The process is very subjective, and even by using a number of positioning rules which define how the positions of certain objects interrelate, it is possible that two different operators working independently on the same material would produce two very different results.

On completion of this process the work is typically published in printed or electronic form by a publisher. The publisher may be a commercial publisher, a society, a corporation, an individual, or any other disseminator of the work.

The content and the design information created in this process are typically stored in a computer-readable file or files, a data stream, one or more database records, hereinafter called data sets, and in all instances may include structural tagging such as is present in XML, SGML, HTML and other tagging specifications.

The design generally includes several different parts that provide structure to the published work:

Paragraph styles: These are applied to paragraphs within the content and specify information such as the fonts and font sizes to be applied to various elements within the work including the main body text, section headings, sidebar headers, sidebar text, captions, running headers and lists. Type specifications may also be detailed separately from the paragraph styles and include rules to provide stylistic control to the typesetter such as the use of hyphens within the final document. Paragraph styles deal primarily with the format of the paragraph. They do not generally provide any guidance on the relative or absolute positioning of paragraphs, although a style may provide some control over the number of lines allowed to exist in isolation from the rest of the paragraph when a paragraph is forced to break into two or more parts. The latter is known within the art as "keep" options, or "widow/orphan" control. A paragraph style may also define relationships to the preceding or subsequent paragraph, or to specify whether the entire paragraph must appear on a single page.

Master pages: These are document specifications that are used as the template for a defined display area such as pages within a work. For example, in printed works master pages typically include elements whose positions and characteristics rarely if ever change, allowing these pages to be predefined. These pages may include background graphics used on part title pages, running heads and footers used on the main text pages, background shading behind page margins and placeholders for things such as page numbers and chapter titles. Many publication designs specify multiple master pages for different display styles.

Elements: These are items that change in terms of both position and content. They are defined by the designer, and may be illustrated with sample text and images (in the case of Figures, for example), and they may have associated positioning rules such as "always place at the top of the display area". Elements include logos, advertisements, menus, sidebars, tables, figures and other items relevant to the work's purpose and design.

Document DTDs (document type definition) and schemas are definitions of the structural tags that may be used to describe a particular type of content. DTDs and schemas generally are expressed as a sequential or nested series of structural entities that are then applied to the content. For example, a schema with a heading entity allows the content to be described as a heading entity. DTDs and schemas are typically derived in a manual analytical process or derived from other DTDs and schemas. They relate to both the content and the structural design of that content, but the act of preparing a DTD or schema is usually carried out as a separate process to that of preparing the design and the content.

Some content may be created and stored in a database system. This content may derive from secondary databases or may be entered directly into the database. This type of content typically includes information related to commercial products such as product descriptions and specifications. Some database systems are able to apply stylistic tags to the content in the database and/or publish that data in a structured fashion. Some of these database publishing systems include the ability to express dynamic data from multiple databases.

Related to database publishing systems is a class of automated software used primarily for report generation and transactional documents such as invoices, insurance documents and prospectuses. These systems are primarily focused on high-speed large volume data processing and have always been limited in their graphical sophistication. They are not suitable for high-quality commercial publishing applications.

Some document automation systems utilize software that augments the function of page layout applications such as QuarkXPress, Adobe PageMaker, or Adobe InDesign to allow them to function as database publishing systems. These systems are limited to highly structured data and have limited ability to deal with any variability in data length or appearance.

Several desktop publishing packages also offer automatic alignment features that can move an element, for example, to the top or bottom of a page, or maintain its position with a specific reference point in the content. These systems have limited capacity to resolve complex conflicting positional requirements. Many desktop publishing packages also offer scripting or other programmatic systems which allow a certain amount of control over the layout process to be exercised by a suitably skilled programmer. This functionality provides a method for developing a semi-automated or even a fully-automated layout system. However, there are drawbacks to these systems. A full layout can only be achieved if the intended result is relatively basic or with very significant programmatic development. More complex layouts can be achieved by skilled programmers, but each new design typically requires extensive additional development to accommodate features that are unique to that design. These limitations often render the scripting or programmatic method to be uneconomical when compared to the manual process, which it is intended to replace. Typically an automated template is only developed for books or documents whose basic design will be used in many titles, such as in a series of works, where the total. title count will number in the dozens or hundreds of examples.

Attempts have been made to fully automate the typesetting and/or layout process. These include the development of typesetting software systems such as TeX, Penta and Advent 3B2. These systems provide extensive programmatic support for defining automated templates. However, creating a template for a book that will be commercially-attractive can take up to several months of intensive development. These systems may also provide solutions where templates are rigidly defined using numerical constraints either defined using a series of often lengthy parametric dialog boxes within the user interface, or by some other expression of these parameters via a control file, or via a programmatic interface. There have been attempts to include a graphical user interface in these systems, but the complexity of the code structure makes the interaction with the interface limited in its functionality. The time and cost involved in developing a new specification for a complex template imbues the systems with a level of complexity that makes them inaccessible to the general graphic design and publishing market. The templates that are created for these systems are generally economically non-viable for one-off publications such as a unique book format with a short print run, and are difficult to adjust to the requirements of highly variable content. These systems are also very expensive, both in terms of software and the cost of training operators, and provide no significant cross-media functionality.

A related class of automated publishing system was created to deal primarily with office documents and some technical documentation. Examples include Interleaf and Adobe FrameMaker. These systems have been focused more on document management and production than on sophisticated graphic design presentation.

To support the requirements of complex technical document production a structural tagging system called SGML was developed. Some publishing systems began to support SGML often in a limited fashion and generally with disappointing results. The major drawback of SGML is its enormous complexity and the extent of the structures it tries to encode. A very small subset of SGML called HTML was then developed to enable publishing over the Internet. HTML is extremely limited in its capacity to support the structural requirements of complex documents and visual structures.

In an attempt to combine the benefits of SGML while reducing the complexity XML was developed by a committee of the W3C. XML and its derivatives have begun to drive a range of publishing systems but do not yet feature the graphical complexity and ease of use that would ensure its robust acceptance in the market. Typically XML publishing is driven by programmers rather than graphic designers. Future attempts to improve the interface to XML publishing systems are likely to increase its use. One direction being taken in XML publishing is via XSL-FO, a method of defining the appearance of structural elements within a defined space such as a printed page. XSL-FO is not yet able to provide the graphical sophistication required by most professional print and online publishers.

In summary, the current state of the art is defined by manual desktop publishing systems, semi-automated desktop publishing systems, and fully automated publishing systems. The content and the design information are both stored in data sets which may be a computer-readable file or files, a data stream, one or more database records, and in all instances may include XML or other tagging. In general these systems align along two axis: the simpler to use systems offer the highest and most flexible presentation sophistication but offer the lowest degree of automation; the most complex systems offer a high degree of automation traded off against a lower level of presentation sophistication.

SUMMARY OF THE INVENTION

It is therefore an advantage of the present invention to address the problems experienced in prior art publishing systems by fully automating the document production process while affording the highest degree of flexible graphic design and presentation. In embodiments, the present invention allows a design to be specified simply by drawing the design in a defined space such as a page or a display device, and setting a plurality of rules which define positioning of elements within the finished work. Embodiments of the present invention also allow a fully automated design to be specified by embedding automation-related properties within a manual desktop publishing framework. This enables the specification of fully automated templates from within an environment usually used for a manual layout process.

Embodiments of the present invention also tie together the process of creating a schema with that of creating the document design by automatically deriving the schema from the design. The schema is then delivered to the content creator whereby it is automatically or manually applied to the content and acts to control the structure of the content, ensuring the result is compatible with the automated layout engine.

Embodiments of the present invention also provide a method by which geometrical aspects of components of the design can be recorded as being dependent on other components. This provides a method by which a design drawn on the page may resize to suit highly variable content while maintaining the designer's intent for the original spatial relationships. These spatial relationships may be further extended to provide tabular data with complex formatting behaviour.

The present invention additionally provides a method for graphically preparing a layout design data set and the preferred positional parameters of elements within the design, and a method for extracting structural information from the layout design data set for the purpose of creating suitable textual, graphical and multimedia content for inclusion in the layout. The present invention also provides a method for synchronising the displayed content with the source content and the design data set.

There is an increasing tendency for works which would previously have been published in hard-copy format to now only be published as e-books intended to be viewed on a computer monitor or other display device. Embodiments of the present invention have particular utility in the preparation of electronic or online media that seek to emulate the look and feel of a printed page. Such e-books may also be printed if desired.

In particular, many documents are now presented electronically in the Portable Document Format (PDF) as generated and read by applications such as Adobe Acrobat. This format is primarily intended to preserve a document's layout and format even when viewed on computers which may have different display options and setups. In this way, the creator of a document can ensure that when viewed and/or printed, the intended format is preserved. This is not ordinarily possible with other online formats, such as HTML, where the display device interprets certain formatting options to achieve a desired effect rather than rendering them in their original absolute form.

However, some works which previously would have been published in hard-copy format are now offered in a format specifically suited to Web browsers, without emulating the look and feel of a printed page. The present invention also facilitates this form of online publishing.

Embodiments of the invention are useful but not limited to laying out complex documents such as textbooks, academic studies, directories, regulatory submissions, magazines, newspapers, technical journals, marketing reports, statistical analyses and instruction manuals. Embodiments of the invention also prove useful in the creation of pages and screens for online or offline display on computer monitors or other display devices. Some complex publications, especially those forming one of a series of such publications, can be arranged to present the reader with a consistent style which is common to all members of the series. Embodiments of the present invention allow production of publications which conform to defined layouts or styles, with minimal, or at least reduced, manual intervention in the layout process.

Embodiments of the present invention permit elements of the design to be laid out according to a rule, or a set of rules, which define desirable layouts. The rules relate to the positioning of the many different elements which make up the work. Rules may also relate to the typographical formatting of the work such as the hyphenation and justification rules. The design elements may include textual and graphic elements such as figures, photographs, sidebars, illustrations, graphs and tables and others as determined by the work's designer. The rules are defined in terms that relate any element either to another element or a physical property of the geometric information display, such as an edge or a margin.

Through the application of these rules, using the processes defined in accordance with one or more embodiments of the invention, it is possible to fully automate the layout of page-views composed of dynamically-supplied data.

In a first broad form, the present invention provides an iterative method of laying out elements on a page for printing or online display, wherein the page includes content and design, said content including a plurality of different type and graphical elements, and said design including a rule associated with a particular type or graphical element, said rule defining a scoring system which defines a score dependent on a degree of conformance to said rule, the method further including the steps of:

a) arranging geometrically the plurality of type or graphical elements included in the content;

b) scoring the resulting layout according to the rule included in the design;

c) storing said score; and d) repeating the above steps a) to c) for a plurality of different layouts.

The layout having the best score is preferably selected as the layout to be used in the final work. Alternatively, the user may be presented with a selection of the highest scoring layouts and manually select a preferred layout.

The method may further include the step of dividing the content into a plurality of page-sized sections prior to laying out the elements on each page. The page-view size information may be included in the design. Every page-view layout may be arranged such that each of the plurality of page-view layouts includes the plurality of page-view arrangements in a different arrangement, with each successive layout differing from the previous one in that a particular page-view element is offset from its previous position by a predetermined distance.

Alternatively, and in order to reduce the number of iterations required, each graphical element may be positioned in relation to the geometric boundaries in a position as defined by a rule associated with it. In this way, it is possible to make the layout process more efficient by estimating which positions are likely to give the best scores, and forcing the elements to occupy those positions which are deemed optimal according to the defined rules.

The content may be included in a first computer-readable data file. The design specifications may be included in a second computer-readable file. The first and second computer-readable files may be created separately.

Certain information from said second computer readable file such as the content schema may be available to the first computer readable file. This information may include details of certain defined page elements which may be assigned to certain content in the first computer readable file.

The content may be divided into page-sized portions before the iterative layout process begins. In this way, the layout engine is able to lay out a single page at a time. The division into page-sized portions is performed on the basis of the size of the individual graphic elements making up a page unit. Each graphic element identified in the content is formatted according to the information in the design data file, and from that process, the size of each graphic element, such as sidebars or figures, can be calculated and the content of each page-view determined.

In a second broad form, the present invention includes a system for laying out elements on a page for printing or for online display, including processing means for receiving a first data set included of content, and laying out the content in the first data set according to a rule or plurality of rules included in the second data set included of design specifications, wherein said processor is arranged to generate a plurality of different layouts of said content in a defined relation to the page geometry and score each layout according to a scoring scheme included in said second data set.

The layout engine may be configured to run on a single computer or server. Alternatively, for added efficiency and to provide redundancy, a distributed processing system may be used, whereby the preparation of the presentation of a particular work is split into a number of processes which may be performed in a distributed processing environment, such as different processors within one machine, on a single processor on a single machine supporting a multi-tasking environment, or on a network included of different machines. A convenient way of splitting the layout task is to pre-process the content to create a number of smaller sections, such as parts, chapters, pages or elements, and then to allocate each process efficiently within the distributed processing environment.

The computer system including the layout engine, which operates to combine the data content in the content data set and the specifications contained in the design data set, may also be physically remote from the creators of said files. In this way, the computer system housing the layout engine may be operated by a publisher who distributes the software package or packages needed to create the content and the design, and arranges to receive the data sets produced and uses these to produce the finished work. In one embodiment access to the layout engine may be controlled via a remote log-in or a Web server interface. Preferably, the first and second data sets may be submitted using a suitable data network. An example suitable data network is the Internet. Suitable security provisions may be applied to any data transfers to protect any confidential information.

Alternatively it is possible to integrate all three software processes involved in the preparation of the work (the content creation, the design creation and the layout process) into a single software package which may be operated on a single computer. In this way, a content creator may create the content to be stored as a first data set. He or she may also create a book or Web design, or select one of several pre-defined styles available, and store that as the second data set. The layout process can then be performed locally, with the resultant layout displayed on his or her screen with no need to contact a remote computer.

BRIEF DESCRIPTION OF THE DRAWINGS

For a better understanding of the present invention and to understand how the same may be brought into effect, the invention will now be described by way of example only, with reference to the appended drawings in which:

FIGS. 10a and 10b show the definition of a particular table style and a sample table produced from said table style;

FIGS. 11a–d show different table style definitions and corresponding sample tables produced from said table styles;

FIGS. 12a–c show different table style definitions and corresponding sample tables produced from said table styles;

DETAILED DESCRIPTION

The present invention will now be described with reference to FIGS. 1 through 13b, which in embodiments relate to an automated method of laying out page elements for inclusion in a work for printing and/or electronic publishing. It is understood that the present invention may be embodied in many different forms and should not be construed as being limited to the embodiments set forth herein; rather these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

Figure 1:
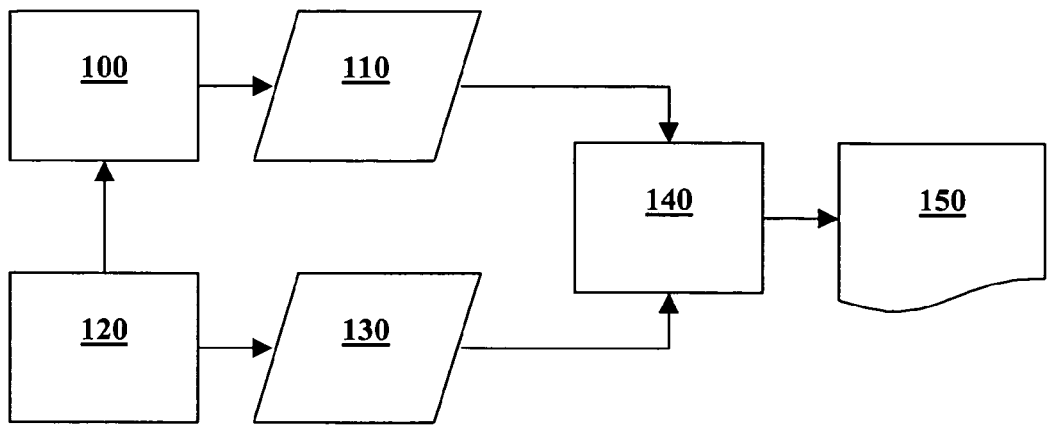
FIG. 1 shows an overview flowchart of the processes, inputs and outputs of an embodiment of the present invention.

FIG. 1 shows a top-level view of the configuration of an embodiment of the present invention, and illustrates the data flow between different parts of the system. Blocks 100 and 120 represent processes involving operators using software applications. Block 140 represents a process performed automatically. Blocks 110 and 130 represent intermediate data outputs, and block 150 represents the finished work.

Process 100 involves the creation of the content, or raw information which will form the content of the finished work. This is typically created by a content creator who may know nothing of the final layout of the completed work. The intermediate output 110 is one or more data sets including raw text and graphical content, which may be supplemented in part by some markup or tag information such as is used by XML. The intermediate output 110 may be stored in a database, enabling it to be reused, at least in part, for multiple titles and in multiple designs, both for print and online viewing.

Process 120 involves the creation of the design data set. This is typically created by a graphic, document or Web designer who may know little or nothing about the content of the finished work. The output 130 of process 120 is a data set which defines among other things, how certain elements which will appear in the completed work, interrelate. The interrelations are defined in terms of rules, which are supplemented with one or more weightings which provide a relative measure of the importance of each rule to the intended layout. The rules may be pre-configured or user-defined. The data set created by process 100 may include tagging specifically intended to be included in the design defined in process 120, or may contain generic tagging typically conforming to a DTD or schema that describes each part of the text and its purpose, such as the chapter heading and chapter number, the body text, and page elements such as sidebar headers and sidebar text, figures and tables. The design data set is included of a number of specifications such as but not limited to the size of the display area or page; the rules that define the preferred positioning of elements in relation to the display area or page and the interrelation of those elements; typographical specifications; colour specifications and other data required to support the intended layout.

While the content creator and the designer who creates the design of the interrelation of elements may be different people, it is understood that the content creator and the designer may be the same person in alternative embodiments.

Process 140 is an automated layout process which receives as inputs both the content data set 110 and the design data set 130. The automated process, as will be described more fully later, lays out the elements defined in the content data set 110 according to the specifications such as the rules defined in the design data set 130. The layout is performed automatically and may include an iterative process which divides the text included in the content data set 110 into page-sized or other sections and lays out each element on that page or section in a plurality of different ways, each having a slightly different arrangement to the others, and then assesses, or "scores," each arrangement according to the rules and weightings defined in the design data set 130.

The final output 150 is a data set including a completed work which is in a format suitable for printing or displaying or uploading to a suitable World Wide Web server as appropriate. Additionally, there may be provided an opportunity for manual intervention if several alternative layouts have the same or similar page scores, or the layout requires manual intervention to solve further conflicting requirements between elements of the work.

When a designer creates the design data set 130, the designer uses a custom software application or an embedded application within another application such as a desktop publishing system. We will refer to both of these as the Designer application. The graphic designer uses the Designer application to create the design data set 130. The Designer application resembles current desktop publishing (DTP) and Web page design applications in that it allows the designer to use tools to create different elements and place them in desired positions on a page. The types of elements which may be created in this way include but are not limited to frames filled with fixed text, automated text frames (or placeholders) that may be subsequently extracted from the data set 110, fixed image frames, automated image frames (or placeholders), background elements such as watermarks and shading, boxes, lines, fields that can represent cross-reference points or repeated information such as a document reference number or a chapter title, and all of the other elements that typically may form a book, magazine or other print or online work.

One of the features of the Designer application that allows the designer such flexibility is the ability to create what we will refer to as automated frames. Automated frames are drawn within the Designer application using a mouse or cursor control, in a similar way to the way in which frames are created using current DTP or Web page design systems. However, automated frames differ from known frames in a number of key respects. An automated frame is configured to reference a particular paragraph style or a particular structural tag. Paragraph styles are referenced to the tags attached to the text of the content 110 by the content creator or, in some cases, by another participant in the workflow or an automated process.

When the design data set 130 is created before the content data set 110 there can be a flow of information from the Designer application to the content creation application shown by the arrow linking blocks 100 and 120. The information passed between them may include details of the defined paragraph styles and page-view element formats such as the paragraphs or other information that needs to be included in a particular element such as a sidebar, table or figure. In this way, the content creator or editor of the content data set 110 is able to indicate that certain paragraphs in the text are to be treated in a particular way. However, he or she does not need to be aware of the overall style of the finished work, merely that he or she wishes a certain block of text to be placed in a sidebar, for instance. In the case where a design data set is not created before the content data set, the content creator may utilize a DTD or schema to provide the structural information related to their content. We refer to this as upstream structural flow. Content does not need to be created using this process, but it offers certain benefits specific to the invention.

Where there is upstream structural flow the content data set creation process 100 may be carried out by the content creator using a content creation application. An example of a content creation application is word processing software. Typical applications for this purpose include Microsoft Word, Word Perfect, an XML editor or an HTML editor. Content may also be created using any other data processing application able to output content with the structural tagging required by the invention, for example a graphics preparation application such as Adobe Photoshop or Adobe Illustrator. The content data set may also be derived by one or more references to content data stored in a database or embedded within other files such as a PDF document.

The content creation application is provided with additional software functionality which allows the content creator to manually apply structural tags to the content, or for the content creation application to automatically apply structural tags to the content. We will refer to the content creation application combined with the additional software functionality as the content creation system. It will generally not allow the content creator to dictate details regarding the actual position of any page elements, but will allow him or her to assign certain distinguishing properties to certain elements. For instance, in the case of a word processing application, if the content creator wishes to highlight a paragraph of text which is intended to be placed in a sidebar, ie. separated from the flow of the main text, and usually boxed, or otherwise distinguished, he or she may be able to select the text in question and select an appropriate menu option, using mouse or keyboard, to tag the text in question. The options available to the content creator are determined by the schema derived from the paragraph styles, page elements and other specifications defined using the Designer application process 120 and communicated to the content creation system process 100.

For instance, in the case of a word processing application, when preparing the content, the content creator may create a short paragraph, with a heading, which he or she intends to be featured in a sidebar so that it does not interfere with the main text of the work. He or she is able to select the paragraph heading, and tag it from a menu, for example as 'sbHead', indicating it is to be treated as a sidebar header, and positioned and formatted accordingly. He or she is also able to select the paragraph text, and tag it for example as 'sbText'. (The tags 'sbHead' and 'sbText' can be arbitrarily named by the operator of the Designer application. They can also be mapped from a DTD or schema imported into the Designer and content creation applications.) In many instances the content creation system is able to automatically apply the appropriate tagging to the content without user intervention.

The text in question may be tagged in a way that remains normally invisible to the content creator, other than if he or she chooses to examine the properties of a particular item of text, or the text may be displayed in a distinctive manner, perhaps in bold, underlined or shown in a different colour. Of course, any combination of these may be used.

The tagging of content may be achieved using a markup language such as HTML or XML, or a machine-readable labelling system may be used. In any event, the content creator is able to clearly and simply delineate certain elements within the content.

Once the content creator has completed his or her work, and tagged it, if desired, he or she can forward the completed content data set to the work's publisher, or directly to the Publishing Engine 140.

References to Block 100 may represent process 100 or the content creation system. References to Block 120 may represent process 120 or the Designer application. References to Block 140 may represent the layout process 140 or the Publishing Engine application.

FIGS. 2 through 6 show examples of one page element, known as a sidebar, as well as a template for setting up the sidebar. Sidebars are often included in books and other publications, and generally provide short summaries of topics, interesting facts, illustrative graphics or other text related to the main, or body, text.

Figure 2:
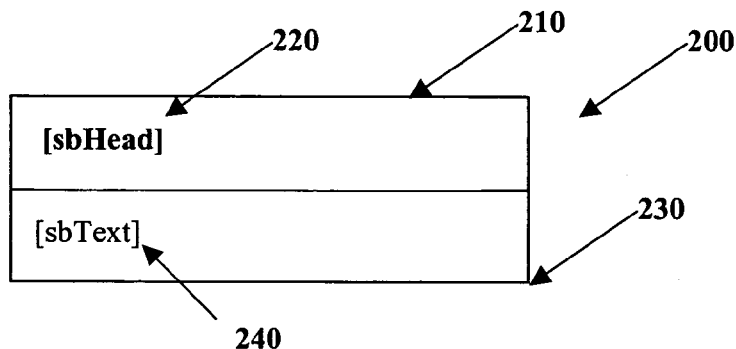
FIG. 2 shows a sample design of a sidebar element.

FIG. 2 shows how a sidebar element 200 may be defined. The sidebar consists of two frames (in the invention a frame that is used to import source content is referred to as an "automated frame"; automated frames may include a combination of pre-determined and imported source content): the first frame 210 including the sidebar header text, or title, and the second frame 230 including the sidebar text. When creating automated frames, the designer creates each type of element using the Designer application. Since the final size and absolute position on the page of the completed work is unknown, in this example the only significant dimension of the automated frames 210 and 230 are their widths, which are set to the width defined by the content creator in the content creation process 100. In other examples the widths may be varied by the layout engine. In this example the height of the frames is determined both by the amount of text which they must contain(as determined by the content creator at process 100) and also determined by the formatting properties that were specified for that text by the designer. Additionally the height of the frames may be fixed with any overset text forced to flow into other frames.

The formatting, ie. non-positional features, of the automated frames are defined by the designer. In the example shown in FIG. 2, automated frame 210 includes a tag for the sidebar header 220, and while not visible in the example, the designer has specified the formatting properties of the tags. This is formatted so that the text is left justified and appears in Bold 12 pt Times Roman font. Automated frame 230 includes the sidebar text 240, and this is formatted so that the text is left justified and appears in 10 pt Arial font. These properties are merely by way of example, and different and/or other properties may be added to each automated frame by the designer as he or she creates them. Other typical properties applied to the frame or the tags may be text colour, background shading, border style and colour.

Figure 3:
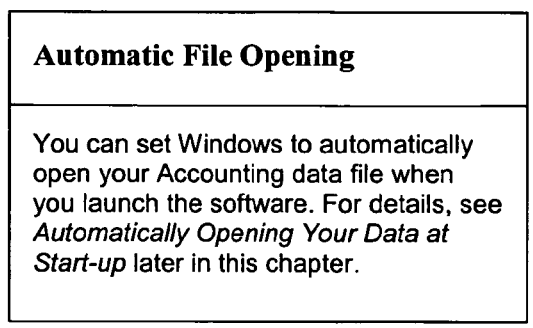
FIG. 3 shows the same sidebar with content combined with the design.

FIG. 3 shows an example of how a sidebar might appear in the finished work 150 when formatted according to the specifications in the design data set 130. The heading is shown in a separate box from the text, and is presented in a bold font as specified in the template shown in FIG. 2. The text is sourced from the content document 110 where the paragraphs have been linked to the tags or styles named '[sbHead]' and '[sbText]'.

Another feature of the automated frames is their ability to reference special fields, for example allowing them to be used to insert an incrementing counter, another part of the text from elsewhere in the book for cross referencing purposes, chapter and title numbers, catalogue numbers, information referenced from a database, or other information or data available in machine-readable form. The designer is able to specify exactly what information may be inserted, and from where it is to be sourced.

Another feature of the automated frames is their ability to extract multiple related paragraphs from content. For example, the 'sbText' tag or style reference may be placed in an automated frame with a 'Repeat' function. The Publishing Engine 140 uses this option to trigger a behaviour wherein all further paragraphs following sequentially from the first 'sbText' paragraphs that have been assigned the 'sbText' style or tag will be incorporated into the current element. This allows elements with an unknown number of paragraphs to be incorporated into the final element display format. Where the content tags required for an element are unknown at the time the design data set is created, a wildcard tag may be used to stand in for any other tagging, allowing the document designer to create a general element design that the layout engine can adapt by applying the same techniques used to set a complete page to all the sub-elements within a single element. This highlights in part the recursive nature of the layout engine. It can be applied to an entire work, to a series of pages within a section, to a single page, and to sections of that single page.

Figures 4, 5, 6:
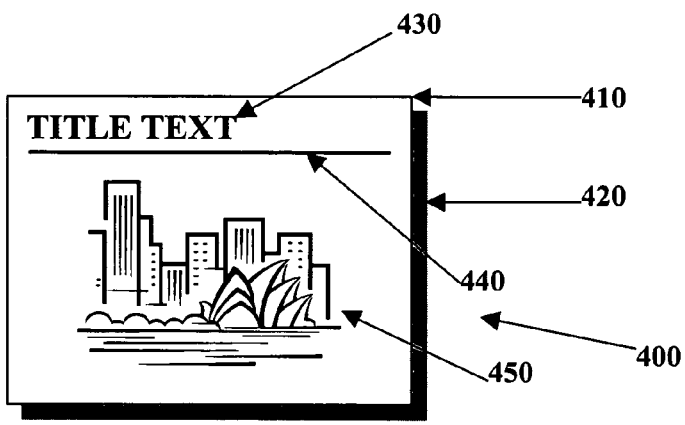
FIG. 4 shows a further sample definition of a sidebar element.
FIG. 5 shows the same sidebar with content combined with the design.
FIG. 6 shows a further sample sidebar including graphical content.

FIG. 4 shows how a sidebar template may be created in the Designer application which includes the previously described elements of header and text with 'sbText' incorporating the 'repeat' option described above. It also includes new parts 'Sidebar' which is just plain text reading 'Sidebar', and {Ch#} and {Sb#} which are automatically incrementing fields which insert the current chapter number and sidebar number within that chapter, respectively.

FIG. 4 further demonstrates how the specification of a sidebar or other element within the template provides the initial form of a DTD or schema that is inherent within templates created using this invention. The design data set created by process 120 includes all of the information required to derive a suitable DTD or schema that can then be applied to the content data set and then supplied to the formatting engine so that it may express the content through the design. The DTD or schema is extracted from the file by parsing the contents of each element, and deriving the sequence of paragraph style markers/tags and fields therein. In the invention, multiple text frames may appear within a single element definition, with each containing multiple paragraph markers/tags and fields. To consistently derive a DTD or schema, the invention uses a scanning approach described below whereby the coordinates of each frame within each element definition page are compared. The frames are ordered so that they fit the natural order of reading of the current language and the contents of the frame are then parsed in the natural order to derive the DTD or schema.

For example, in an English-language template (or any template created for a left-to-right, top-to-bottom reading system), each frame is referenced in order by its coordinates, starting with those in the top-left corner of the page and finishing with those in the bottom-right corner of the page. When two frames have an equal upper coordinate the frames are prioritised in order from left to right. When two frames have an equal left coordinate the frames are prioritised in order from top to bottom. The contents of each frame within the symbolic order are then parsed to derive the DTD or schema for the complete element definition. A template created for right to left reading systems will use right to left scanning instead. The paragraph markers and fields from each frame on the page are added to the DTD or schema according to their priority. Frames such as those used for the insertion of images into an element are also included in the DTD or schema. In most instances this is sufficient to generate a DTD or schema that can be used to tag or to apply structure to the content. When the content data set is processed by the engine, the content can then be matched to the template design. There may be times the designer wishes to change the order of elements within the DTD or schema for an element or an entire document. A facility is provided with the user-interface which allows the user to easily change order of elements and sub-elements within the DTD or schema file.

There may be occasions where the DTD or schema used to specify the content data set is essentially incompatible with a selected template chosen for formatting the output. In this instance a transform application is provided within the system whereby elements and sub-elements from one DTD or schema may be matched to the elements or sub-elements of another DTD or schema thereby allowing the content to be suitably restructured before the layout process. Within the transform application the user may elect to reorder content within the element, to delete content stored in elements that are not compatible or not required for the design, and to otherwise provide automatic adjustments to the transformed file.

Where the specific nature of the content required for an element is unknown at the time the design template is created, the addition of wildcard tags provides a means of specifying the requirement to include content within an element, but without the need to limit the structure (such as the paragraph styles used) of that element. For example, when the designer creates the design for a sidebar that may typically be used for lengthy topics combining an unknown combination of paragraph styles they may specify the inclusion of a wildcard tag within the element. On encountering a wildcard tag the content creation system suspends the application of structure to the content to allow any content including multiple paragraph styles or tags to be included from that point until the user indicates they have completed this process. At that point the content creation system resumes its automatic or manual tagging of the structure of the content.

FIG. 5 shows an example of how a sidebar formatted according to the template of FIG. 4 may look if it is the third sidebar in the second chapter of the finished work 150.

FIG. 6 shows another example of a sidebar. The sidebar 400 shown in FIG. 6 includes a frame 410, having a dropped shadow in the form of an offset, partially obscured shaded frame 420. Inside the frame 410 is a title 430, which provides some information on the topic of the sidebar. The title 430 is separated from the main body of the sidebar by a horizontal rule 440. Beneath the horizontal rule 440, is the main body of the sidebar 400. In this case, the main body consists of a graphic image 450, although it could alternatively be a text passage, an equation, a graph or any other item.

In prior art layout systems and methods, the individual elements described above would generally be created and placed manually, resulting in a time-consuming and labour-intensive process. However, embodiments of the present invention permit page elements such as the sidebars discussed with respect to FIGS. 2 through 6 to be created automatically according to pre-defined rules.

Figure 7:
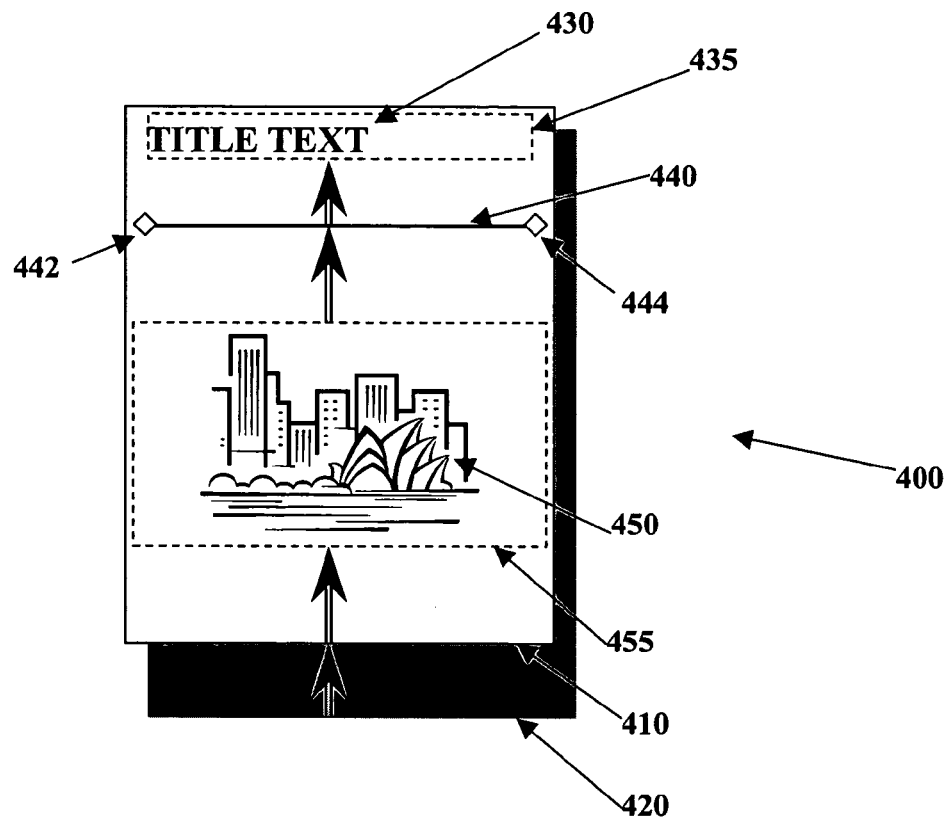
FIG. 7 shows how different features of the sidebar of FIG. 6 interrelate.

FIG. 7 shows the sidebar of FIG. 6 with the addition of several structural elements which facilitate the automation of the layout process. The individual components of the sidebar are structured in a defined spatial relationship, such that the position of any one component is dependent on the position of at least one other component. We will refer to these frames as variable-geometry derivative frames.

In the example of FIG. 7, the first element to be included in the formatted sidebar is the border 435 around the title text 430. The border defines the size and position of, and is a placeholder for, the title text 430.

Horizontal rule 440 which separates title text 430 from the main content 450 of frame 410 is defined as the line joining points 442 and 444, shown as diamonds in FIG. 7. The vertical positions of points 442 and 444 are defined in terms of the vertical position of the lower edge of border 435. In effect the vertical position of the line 440 is defined as being equal to the vertical position of the lower edge of border 435 with a 0 mm offset. In this way, in the formatted output the line 440 will lie exactly on the lower edge of border 435. Of course, the offset can be set to any positive or negative value to achieve a different effect. The end result is that if the lower edge of border 435 is moved, then the line 440 will move in a corresponding manner.

In a similar fashion, the upper edge of border 455, which surrounds the graphic image 450 forming the main content of frame 410, is defined in terms of having a 0 mm offset from horizontal ruling 440. In this way, any movement of the title text 430 will result in line 440 moving due to the previously defined spatial relationship, and the image 450 moving due to its similar dependency on line 440. The lower edge of border 455 is defined in terms of the size of the image 450. If the image is changed for another, or re-sized, then the lower border is adjusted automatically as necessary.

The position of frame 410 is dependent on the lower edge of border 455. In the present example, the position is defined with a 0 mm offset, although this can be altered to leave a greater margin around the graphic image 450.

Finally, the last spatial relationship defined for the sidebar 400 specifies the position of the shadow frame 420. Unlike the other relationships defined thus far, the shadow frame 420 is defined in terms of the position of the lower edge of frame 410, plus an offset of some distance, for example 6 mm. Another offset is defined in relation to the right-most edge of frame 410, giving the characteristic offset appearance of the shadow frame 420.

The various spatial dependencies of the variable-geometry derivative frames and lines defined in sidebar 400 are illustrated in FIG. 7 by double-lined arrows.

The effect of the dependencies is that if the position of any single component shifts, then the position of any component which depends on the altered position, either directly or indirectly, is also altered automatically according to the defined relationships. Although not illustrated, spatial dependencies may also be defined to apply on a horizontal level so that widths or left/right positions from one frame become the basis of another in the same manner that the heights and vertical positions can be made dependent. Using this method the design of an element can be automatically adjusted to suit the content. In the case where a number of different designs are provided for the same element it is further possible to trigger the automatic progression from one design of that element to another when a specified parameter is exceeded such as a frame height within one of the related element designs exceeding a certain limit. This will allow the content to be formatted according to the alternative element design. For example, the text of an element that in the first instance would usually occupy just one column across a two-column page design may be retargeted at an element that utilizes a two-column design if the text causes a frame to exceed a certain extent such as, for example, the vertical height of the page's primary text frame.

Another feature of the automated frames is their ability to repeat themselves horizontally across the page and vertically down the page for the purpose of defining and rendering tables. A single frame set with an option to repeat horizontally and vertically can act as the basis for a table including multiple columns and rows. This can be seen in FIG. 10a which shows how such a frame may be defined. FIG. 10a shows the on-screen display as seen by the user of the Designer application 120. The check marks shown in the boxes marked 'Repeat Horiz' and 'Repeat Vert' indicate that the corresponding frames are to be repeated as more information for them is provided by the content creator. The number of repeats is driven by the number of rows and columns in the content submitted through the content creation system 100. The formatting of the lower right hand cell—white text on a black background—is repeated as additional relevant data is processed by the Publishing Engine 140.

FIG. 10b shows a view of a sample table as it would appear in the finished work 150 on the basis of the table definition shown in FIG. 10a. The repeating ability of a cell defined within the Designer application 120 is re-interpreted by the content creation system 100 to prompt the content creator for the appropriate number of rows and columns. By combining repeating cells and non-repeating cells within a single table definition it is possible to create any table format with any combination of formatting options, from simple clear shading through to complex alternating vertical and horizontal patterns. This enables the appearance of the table to be defined to a certain degree before the actual extent of the rows or columns in the content is known.

The Designer application 120 may provide other configurations of repeating rows and/or columns as shown in FIG. 11a. In FIG. 11a, a table may be defined having alternating shading patterns. The table definition shown in FIG. 11a forces the two rightmost columns to repeat as data is added to the table.

A table produced using the definition of FIG. 11a is shown in FIG. 11b, where the alternating light and dark shading defined in FIG. 11a can be clearly seen. As a further alternative, this type of behaviour can be created in horizontal and vertical directions simultaneously to produce a checker-board effect. FIG. 11c shows a table definition where light and dark shading alternate in horizontal and vertical directions. FIG. 11d shows a sample table resulting from such a definition.

In all the examples of FIGS. 11a through 11d, the addition by the content creator of more data in further rows or columns results in the automatic application of the format information defined in the table definitions in the design data file 130 to be applied to those further rows and columns.

Figure 12C:
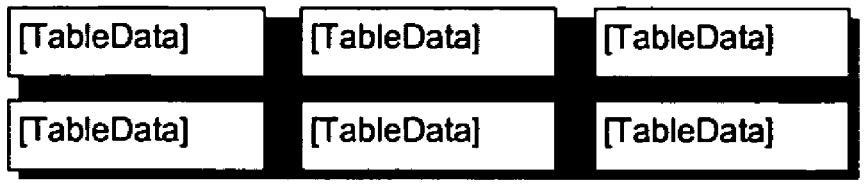

The user may also provide a repetitive behaviour of a design component that is spatially referenced to another component. For example, the border of a background shadow frame may be linked to the border of a repeating cell within a table. FIG. 12a illustrates how a user may define a table to include a number of cells each having a dropped shadow. A menu over the graphical user interface may be provided allowing the user to select the shadow only behind the first cell. When the menu option, which may read for example "on first instance," is selected, the shadow in the cell shown in FIG. 12a will appear only behind the first cell irrespective of the number of cells making up the table. Alternatively, if the repetitive behaviour is set to repeat "on each instance" of the table cell, a copy of the original shadow will be placed behind every cell making up the table, as shown in the sample table of FIG. 12b. As a further alternative, if the background shadow is set to "span", the shadow will be drawn only when the last cell has been placed in the table and will stretch from the original instance of the table cell to the last instance of the table cell. The type of table resulting from this element definition is shown in FIG. 12c, where the background shadow is contiguous and spans all the cells making up the table.

Certain fields such as were described earlier in discussing 'automated frames' and 'incrementing counters' can be linked to repeating frames to achieve specific results such as an incrementing counter. For example, a frame containing an incrementing counter may be linked to a table cell and set to repeat each time the table cell appears within the current table. In this way a line counter may appear outside the table, automatically replicating and incrementing itself each time a new row within the table is created.

Figure 13A:
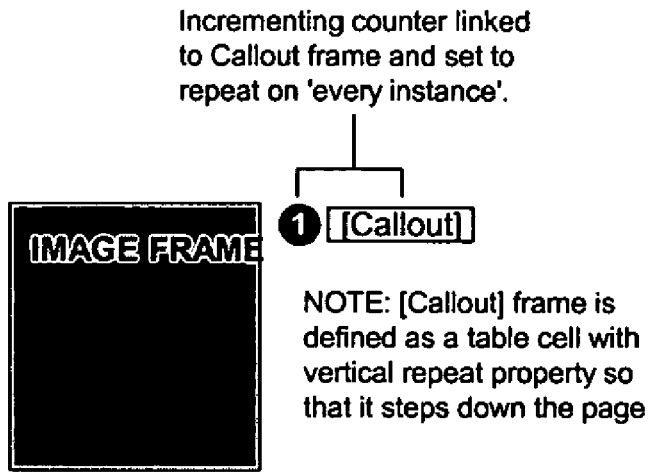
FIGS. 13a and 13b show a figure definition and a sample result of applying said definition to content.
Figure 13B:
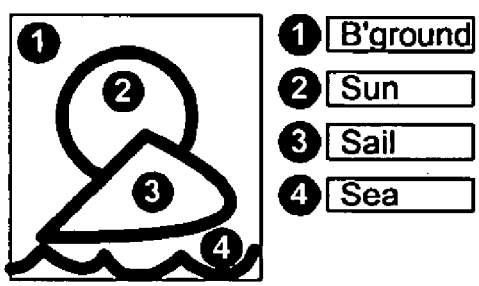

A particular application of this table definition process can be applied to figures and their associated callouts. A callout is often used to highlight a particular feature of a figure and is usually represented separately to the figure's caption. FIG. 13a shows the definition of a single column table that acts as the recipient of callout information for the image frame to its left. A callout frame is defined as a table cell with a vertical repeat property and an appropriate offset so that it steps down the page. The callout information may have an associated incrementing counter field linked thereto. The counter (shown as a '1' in FIG. 13a) has a defined spatial relationship to the table cell where an option such as a 'repeat on every' property is turned on. This results in Publishing Engine 140 placing a copy of the counter beside each table cell as the callouts contained in the content data set are processed. FIG. 13b shows a sample result where specific elements, numbered 1 to 4 in the figure on the left, are related by context to corresponding numbers in the table on the right. The numbers in the table are generated by each instance of the counter, which in turn is included through the processing of an instance of a callout included in the content. In a further example, as more callouts in the figure are added and referenced, a corresponding numbered entry in the callout table will be created. This method allows for the inclusion of formatting elements external to the table to be automatically included when the inclusion of those additional formatting elements is not directly specified in the content. FIG. 13b shows how callout numbers can be added to each callout through their association with a repeating cell. This requirement to insert a callout number is not exposed to the content creator as it is handled by the engine in response to the design.

Figure 8A:
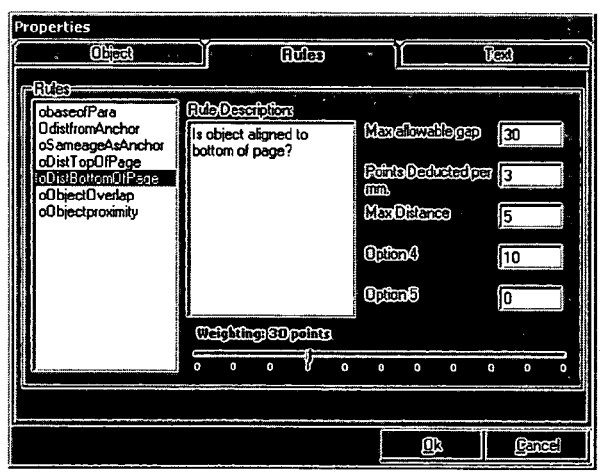
FIG. 8a shows a sample computer menu used to define a rule.
Figure 8B:
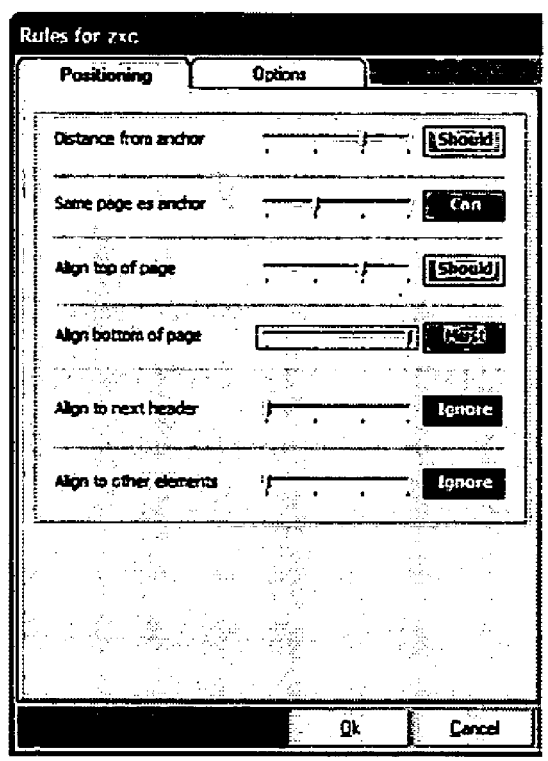
FIG. 8b shows a simplified computer menu that may be used to select and assign priorities to rules.

Inclusive of the foregoing the Designer application may be used to define a series of rules which are then used by the Publishing Engine 140 to produce the final work 150. FIGS. 8a–b show sample popup menus from the Designer application which may be used to define positional rules for each element which will appear in the final work. The menu is presented to the designer when he or she selects an option to assign rules to a defined element, such as a sidebar or a graph.

A sample rule may be, as shown in FIG. 8a, 'Is object aligned to the bottom of the page?'. This particular property may be desirable for certain page elements. The sample rule shown in FIG. 8a has four numeric quantities associated with it. The first one, labeled 'Max allowable gap' indicates that the rule will score 30 points (out of a maximum 100) when the associated page element is within the 'Max Distance'—shown as the third quantity—of 5 mm of the best possible position, ie. when it is absolutely level with the bottom of the page. The second quantity—'Points deducted per mm'—indicates that for every mm that the element is positioned away from the ideal location, 3 points will be deducted from the score. The fourth option indicates that points will no longer be deducted once the element is 10 mm from the ideal position. The numeric quantities may be hidden from the user for rules built into the system, or expressed as part of a user-defined rule. The rules and interface shown in FIG. 8a are indicative only of some of the rules that may be used within this system. FIG. 8b shows another embodiment whereby the interface is simplified for the end user to the extent that they are limited to selecting a priority for each rule that may be applied to the positional requirement of an element, the priorities displayed being "Ignore", "Can", "Should" and "Must". Other parameters such as those shown in FIG. 8a may be defined programmatically but are not exposed to the user.

An interface also is provided to allow end-users to add their own rules to the system. Rules may also control typographic aspects of the layout such as specifying, in one example, that "there should never exist a sequence of 3 or more lines each ending in a hyphen". Both programmatic and/or graphical interfaces may be provided to the user. The programmatic interface allows the user to define rules using a programming system that may interface with the publishing system. The graphical interface allows the specification of rules where actual programming is not required.

The rules are stored in the design data set 130 along with the style definitions, and can be used with a range of different source contents 110. This allows one design data set 130 to be used in the Publishing Engine 140 of any number of works which may form a consistent series. For instance, a series of books produced by a single academic textbook publisher can all be produced using the same design data set 130, resulting in a whole series of works which conform to a single style, with no need to manually prepare the works each time.

Other rules may be defined as necessary. For example, a rule may be defined to check if an element is on the same page as its anchor, being a reference point embodied within the content data, with 50 points being awarded if it is, and 0 points if it is not. This rule shows a simple binary rule which either scores maximum points if a condition is satisfied, and 0 points if it is not. In this instance there is no need for additional parameters. This is in contrast to the earlier rule described for FIG. 8a which allows for weighting and some deviation from the ideal position, but reduces the scoring of a layout for greater deviations.

The final step in the production process is the layout operation performed by the Publishing Engine 140. The inputs to this automated process are the content data set 110 and the design data set 130.

The first step in the layout process 140 involves extracting the tagged text from the content data set 110, and formatting it according to the style information contained in the design data set 130. The formatting extends only to font, character size and insertion of figures, graphs, sidebars and the like. For instance, sidebars are created by extracting the tagged text and formatting the text according to the definitions in the design data set. In this way, the overall size of the sidebar is determined based on the amount of text to be included and the width which was fixed in the design data set.

After all text and other material has been extracted and formatted so that it can be sized, the next step, in one example of the work to be produced, is to divide all the material into page-sized sections. Hereinafter pages will be seen as but one example of a display space. The page size and other formatting information is specified in the design data set 130. Using an iterative process, the Publishing Engine 140 generates a plurality of different layouts according to which elements are present in the content that may be seen in the first instance to be contained within each page. If a particular page consists of only body text, then there is generally only one format possible, as the body text simply fills the space available. However, if a page has any content which is non-body text, such as elements that may suit a number of different positions on the page, then the layout engine iteratively arranges the page elements in different positions on the page for each possible layout, scores each layout according to the rules applied to each element, and elects to use the highest scoring arrangement in the final layout.

The iterative process is illustrated in FIGS. 9a–h. The trim size of the final print page is represented by box 350. The page area available for the layout of body text is represented by box 330. The area between box 330 and box 350 generally is reserved for margins, headers, footers or page numbering, and none of the content of the content file is initially included there. Once an element has been extracted from the text it may be positioned according to the design specification within or external to box 330 This particular page includes a graphic 300, a sidebar 310 and an item of framed text 320, as well as body text (not shown) which can be arranged to fill the remaining space in box 330. The dotted horizontal lines indicate the minimum increment 340 by which the position of the various page elements can be altered during each iteration of the possible layouts. The dimension of the increment 340 is exaggerated in the figures, and may be set to approximately 1 mm in practice. The increment may be lesser or greater than 1 mm in alternative embodiments.

Figure 9A:
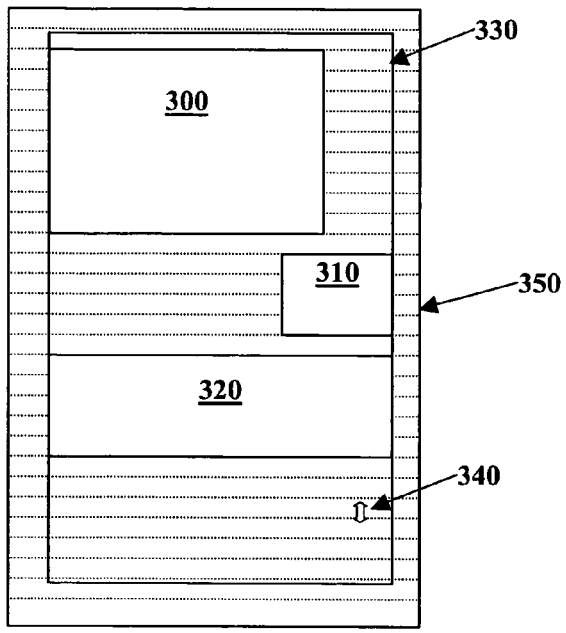
FIGS. 9a–h show various iterations in an iterative layout process according to an embodiment of the invention.

FIG. 9a shows the initial layout of the elements on the page after the entire content data set has been sized. In FIG. 9a the layout was determined by arranging each element so that no element overlapped another element and each element was vertically spaced to maintain the measure used to increment each iterative layout. Alternately, an initial layout may be used in some instances whereby each element overlaps in the first position available which can improve the resulting design. In between and around elements 300, 310 and 320 runs the body text (not shown) which has been positioned on that page. The layout process 140 evaluates the rules associated with each element on the page, including any associated with the body text, and stores the result for that page layout.

Figure 9B:
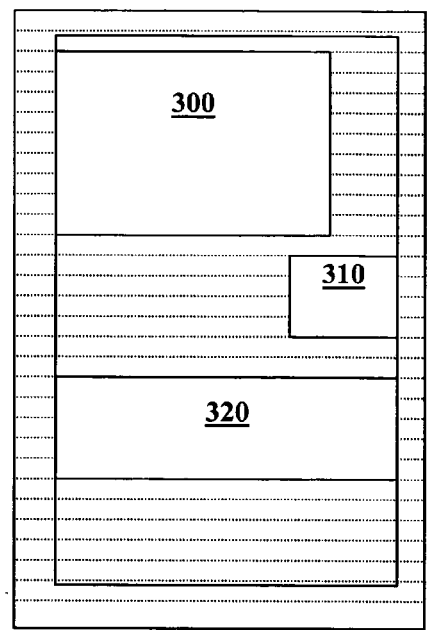
Figure 9C:
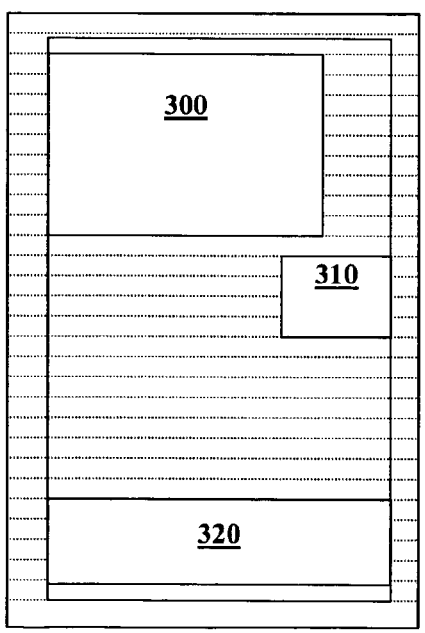
Figure 9D:
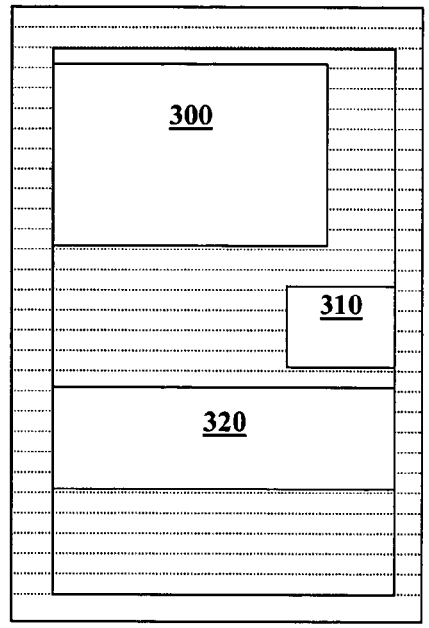

The next steps involve re-arranging the various page elements into the subsequent iterative position, while retaining the same general order of appearance on the page. FIG. 9b shows that the next layout to be evaluated involves framed text 320 being moved one increment down the page while the other elements remain as they were in FIG. 9a. This new layout is evaluated according to the same rules as before and the new result is stored for this layout. Continuing with this instance the process of moving element 320 downwards one increment at a time is repeated, and the scoring for the resulting layout according to the applied rules evaluated each time, and the result stored, until the element 320 reaches the lowest point it can occupy on the page as determined by the rule associated with that element, as shown in FIG. 9c. At this point, after storing this page's score, element 310 is now moved down the page by one increment, and element 320 moves back up the page to be positioned just below element 310. This is illustrated in FIG. 9d. Again, the page is scored according to the rules, and the process of shifting element 320 down the page one increment at a time and scoring and storing each layout continues until, again, element 320 reaches the lowest possible position on the page according to the rule associated with that element as shown in FIG. 9e.

Figure 9E:
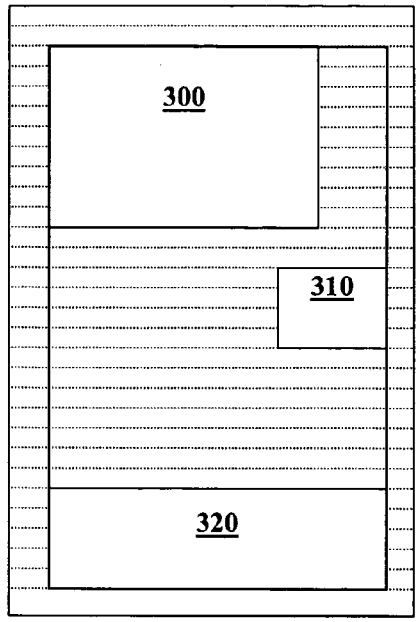
Figure 9F:
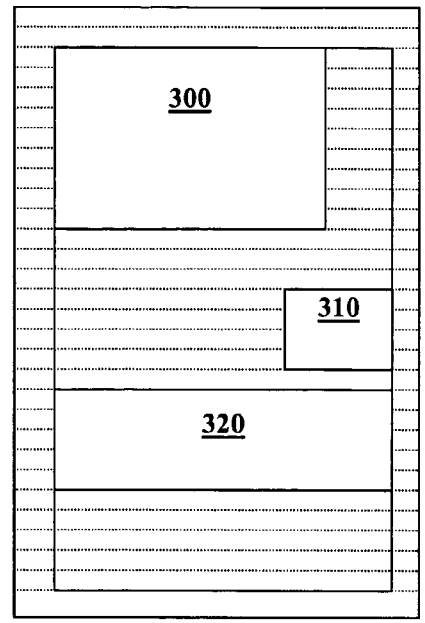
Figure 9G:
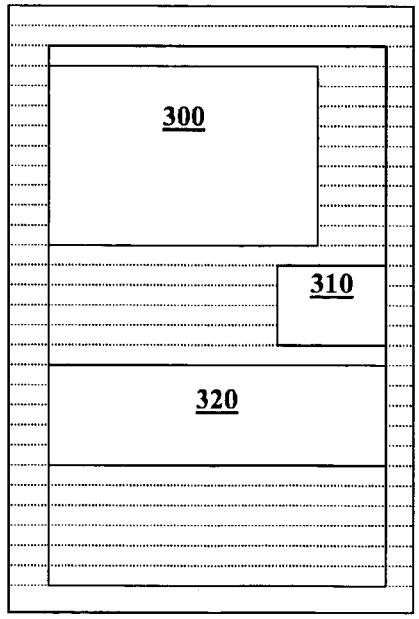

FIG. 9f shows the next step immediately following that shown in FIG. 9e. Element 310 moves down a further increment, and element 320 moves to be just below element 310. The entire scoring, storing and shifting process continues until both elements 310 and 320 are positioned as low as they can be on the page according to the rules associated with these elements. At this point, element 300 is shifted down one increment, as shown in FIG. 9g, and the entire process repeats.

Figure 9H:
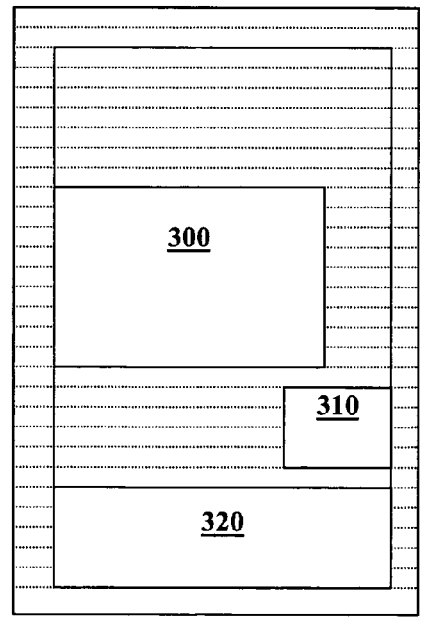

The final step in the iterative process for this particular page is shown at FIG. 9h, where all three elements 300, 310 and 320 are positioned as far down the page as they can be according to the rules associated with these elements. The final score for the page is then stored.

All the scores which have been stored for the layouts of the page generated through this process are stored. The layout process is configured to search through all the stored scores, of which there may be several million or more, and determine which layout produced the highest score, and the layout with the highest score is thus considered to be the most suitable layout according to the rules defined in the design data set 130. The highest scoring layout is thus chosen as the layout for that page. The page is configured according to the chosen layout and copied to the master document for eventual output from the process. The layout process then moves on to the next page, and the iterative process begins again for the new page. The entire iterative process is repeated for every page in the work and may involve multiple sets of iterations where a page contains more than one column or more than one set of element designs.

The layout system may further use the process of recursion to control the extent of a layout, ie., the number of pages or screens required for the finished work. In one example the placement of elements may be combined with the adjustment of word and letter spacing to force the content to fit within a finite space. Where there are space constraints, this process is carried out by first laying out the pages and measuring any overrun or underrun of pages calculated with respect to the defined constraints. For example, there may be a constraint to fit the content into three pages but on the first layout the result runs to four pages. In this instance the Publishing Engine 140 may reduce most of the elements within the document and the primary content by approximately 25%. The designer may have already applied constraints to certain elements and objects to provide parametric limits to the amount of permissible reduction or squeezing of space of said objects. The Publishing Engine 140 may then proceed to adjust the existing layout by first providing up to 25% compression of the word and letter spacing within the document. This may cause the resetting of elements and the repositioning of them on the page. Once again the page extent can be measured and any overrun or underrun calculated. If required the process may be repeated until the desired extents are met, or the engine reaches another limit. Once space constraints are met, the above recursive process for positioning elements on a page may be performed for each page as described above with respect to FIGS. 9a–9h.

It is possible to use recursion with the engine to apply the layout and content-fitting techniques to all aspects of a publication such as but not limited to:
the number of words in a line,
the number of lines in a paragraph,
the number of paragraphs on a page,
the number of pages in a document, and
the number of pages in a compound document constructed of a plurality shorter documents.

In the same sense that the Publishing Engine 140 may adjust the layout of elements on a page, the Publishing Engine 140 may also optimise the layout of sub-elements or nested elements within larger elements, and apply the same recursive extent fitting to those elements. Therefore a half-page constraint of a large element containing smaller nested elements will cause the Publishing Engine 140 to attempt various layouts according to the layout rules and to attempt resizing operations of the text and graphics until the space is filled without overset or significant underset.

In the embodiment described above, every possible placement as defined by the minimum placement distance 340 is evaluated against the rules. This can result in an enormous number of calculations being required before a particular layout is chosen. Depending on the computational facilities available, the above-described embodiment offers an exhaustive process to determine the optimum layout for a given page. However, in practical terms, the vast majority of possible layouts created using such a scheme will score very poorly and so be rejected.

In practice, the layouts producing the best scores are those where the page elements are positioned closest to their optimal positions as defined in the associated rules. In another embodiment, therefore, the iterative layout process is somewhat constrained compared to the previously described process. As an example of the constrained process, consider a page including six distinct page elements, A, B, C, D, E and F. In total, in this example, there are four possible rules which can be used to define the position of each element. The rules are:

1. Set element next to element reference anchor
2. Set element at top of page
3. Set element at bottom of page
4. Keep element on same or later page as element reference anchor.

These rules are an illustrative example, and other rules may be defined. The rules are each associated with a scoring methodology as previously described so that exact conformance with a rule will produce a better score than only partial conformance.

In order to limit the number of iterations performed, the possible positions for the six page elements are defined by the four different rules. In this way, the first iteration attempts to place all six elements according to the first rule. In most cases, it will not be possible to place all elements in the position dictated by a single rule, so certain elements will score well, and others will score poorly.

The second iteration attempts to place the first five elements according to the first rule, and the sixth element according to the second rule. Again, this layout is scored and stored. The third iteration attempts to place the first five elements according to the first rule, and the sixth element according to the third rule. The position of element anchors may move during the layout process due to the impact of placed elements in relation to the body text. The latest positional information and the effects a layout has on the body text flow are utilised by the layout engine each time an element is placed on the page. This allows the layout rules to adapt to the latest instance of a page composition as the page is composed. In some instances elements that were initially included in the potential layouts may be dropped from the page design by the engine due to the conditions of their original inclusion no longer being valid. Once the layout has been completed for every valid element the layout is scored and stored.

The table below shows the possible layouts which are attempted in this particular example. The iterations are shown in the left hand column, while the rule applied to each page element is shown in the main body of the table. Iteration 1 therefore shows that each of the six elements, A–F, is placed according to rule 1. At each new iteration, one or more page elements is re-positioned according to a new rule until the final iteration is reached when all elements have been placed according to every possible combination of rules.

|           | Page Element |   |   |   |   |   |
|-----------|---|---|---|---|---|---|
| Iteration | A | B | C | D | E | F |
| 1 | 1 | 1 | 1 | 1 | 1 | 1 |
| 2 | 1 | 1 | 1 | 1 | 1 | 2 |
| 3 | 1 | 1 | 1 | 1 | 1 | 3 |
| 4 | 1 | 1 | 1 | 1 | 1 | 4 |
| 5 | 1 | 1 | 1 | 1 | 2 | 1 |
| 6 | 1 | 1 | 1 | 1 | 2 | 2 |
| 7 | 1 | 1 | 1 | 1 | 2 | 3 |
| 8 | 1 | 1 | 1 | 1 | 2 | 4 |
| 9 | 1 | 1 | 1 | 1 | 3 | 1 |
| . | . | . | . | . | . | . |
| . | . | . | . | . | . | . |
| 4090 | 4 | 4 | 4 | 4 | 3 | 2 |
| 4091 | 4 | 4 | 4 | 4 | 3 | 3 |
| 4092 | 4 | 4 | 4 | 4 | 3 | 4 |
| 4093 | 4 | 4 | 4 | 4 | 4 | 1 |
| 4094 | 4 | 4 | 4 | 4 | 4 | 2 |
| 4095 | 4 | 4 | 4 | 4 | 4 | 3 |
| 4096 | 4 | 4 | 4 | 4 | 4 | 4 |

In a page having m elements and n possible rules, then there are $n^m$ possible combinations to be attempted, scored and stored. In the present example which has six page elements and four rules, then there are $4^6$, or 4096, combinations to attempt. This number of possible layouts, although it requires a large number of iterations, is still significantly lower than the number required using the previous embodiment which may result in several million possible layouts.

Once each iteration has been performed, the layout software is able to select the highest scoring layout. Alternatively, a selection of the highest scoring layouts or those scoring above a predetermined minimum may be selected to allow the user to choose which layout is to be used in the final document.

An additional rule which has particular relevance to the above described method can be defined. This rule forces all elements on a particular page to be retained in the same order in which they appear in the content data file 110. In this way, a large number of possible iterations may be easily discarded if the resultant layout breaks that particular rule. An example of using this rule is in the case of a heading and a sub-heading, where the sub-heading has to follow the heading. In this instance, any layout which places the subheading before the heading can be scored as a zero and discarded with no further evaluation being required.

Before the finished work 150 is created, a post-production process is required. This process performs formatting which cannot be completed until the main layout is finalised, and includes the addition of page numbering, running heads, cross references and table of contents creation. The creation of a table of contents, for example, requires each page to be formatted and numbered. The post-production may in turn adversely effect the layout of page due to, for example, a conflict between a table-of-contents frame and the main text and so may trigger a subsequent complete layout of the pages once more to resolve this conflict. In other examples the layout process may be carried out using the same recursive methodology to allow the layout engine to resolve conflicts within a dynamic scope of layout components including sub-elements on a page that must fit within a defined element, through to ensuring the page extent of a document included of multiple sections or chapters is met.

The layout process is intended to be largely free of user intervention, and performs the layout task primarily on the basis of the rules defined in the design data set 130. However, there may be occasions when human intervention is desirable. For instance, two or more layouts for a particular page may produce equal or similar scores, which may require a human operator to select one option only. At the same time the user has complete freedom to alter the layout after the completion of process 150.

The Publishing Engine 140 may also be configured to operate in an interactive manner with the user to automate many aspects of a manual layout process.

In embodiments of the present invention, the Publishing Engine 140 may be operated remotely from the content creation system 100 and the Designer 120 application. In this way, the designer and content creator can perform their work independently of each other, and submit their respective files via the Internet, for instance, to a publishing house which houses the computers which perform the layout process 140. The layout process can then be completed on the basis of the two submitted files, and a copy of the finished work 150 can be supplied to the content creator and/or designer automatically as soon as the process 140 is complete.

In many cases, the design data set is available before the content of the finished work. In such a case, a content creator may elect to view a preview of a chapter or the whole work. To do this, he or she may select an appropriate option from a menu of the content creation program which sends the current chapter or work to the Publishing Engine 140 via a suitable data link, such as the Internet, together with a reference to the associated design data set which may already be stored with the publisher. The layout process is then able to layout the submitted content according to the existing design data set. The work is then sent back to the content creator in a suitable format for display such as PDF.

In the event that a specific design data set is not available, the content creator may select one of a number of predefined design data sets which may be made available by the publisher. Indeed, in many cases, one of these predefined design data sets may be suitable for the finished work, particularly in less complicated works.

In alternative embodiments, it is understood that all three processes, the content creation process 100, the design process 120 and the layout process 140 may be carried out at single location and by a single person. In such an embodiment, the content creation process 100 and the design process 120 may be combined into a single process.

A person skilled in the art will therefore appreciate that aspects of the above outlined procedure may be performed using a variety of systems. In its most basic form this can be achieved using a processing system that is adapted to use the content data file 110 and the design data file 130 to produce the final output 150. This may be performed manually or automatically depending on the implementation as described above.

Figure 14:
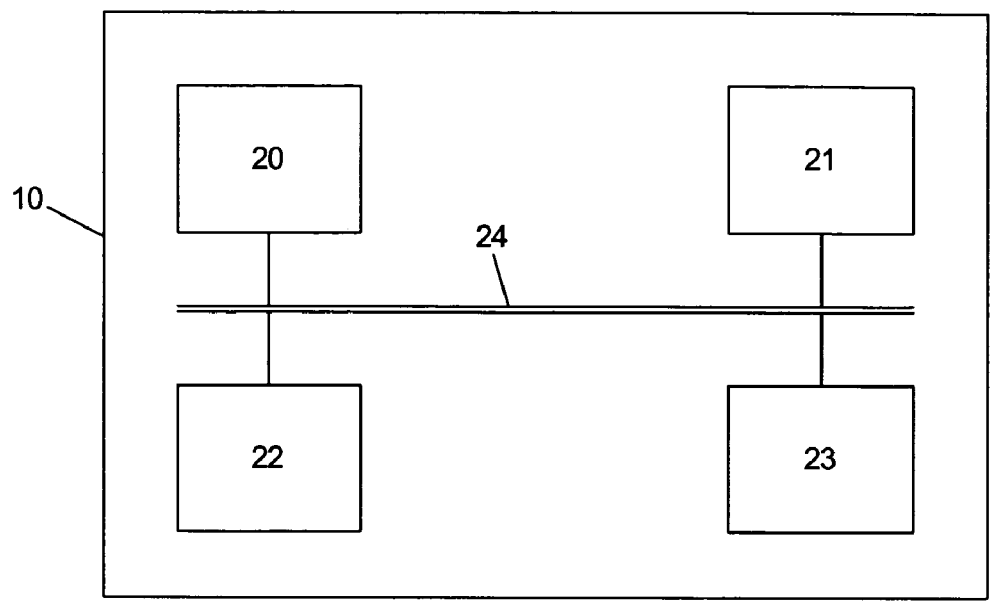
FIG. 14 is a schematic diagram of an example of a system for implementing the present invention.

An example of a suitable processing system is shown in FIG. 14.

In particular, the processing system 10 generally includes at least a processor 20, a memory 21, an input/output (I/O) device 22, such as a keyboard, and display, and an external interface 23, coupled together via a bus 24 as shown.

The processing system may be adapted to receive the content and design data files 110, 130 from an external source, such as via the external interface, or may be adapted to allow the content and design data files to be defined in accordance with manual input by one or more user's via the input device 22. The manner in which this is achieved will depend on the nature of the respective implementation.

In any event, once the content and design data files 110, 130 have been received, the processing system 10 is adapted to execute appropriate applications software stored in the memory 21, to allow the processes described in detail above to be performed, thereby allowing the final output 150 to be created.

Thus, in one example, the processor 20 will extract the content from the content data file and then determine the space in which the content is presented in accordance with the design data. The processor 20 will then arrange the content within the determined display space in accordance with rules defined in the design data, as described above, before "scoring" each arrangement according to the rules and weightings defined in the design data set 130.

This process is repeated with the processor 20 operating to selectively modify the layout by changing the position of one or more content objects within the display space. The revised layout is then scored.

The processor 20 uses the scores of the layouts to determine further changes based on the effect of previous changes on the score. This is repeated iteratively as often as required. Thus, in one example, this is repeated until a predetermined score is obtained, or until no further improvements are obtained.

At this stage, manual review of the layout may be performed by a user, by having the layout presented on the display 22. In this case, a number of layouts have suitable scores can be provided allowing the user to select a preferred layout. Alternatively, selection of a preferred layout may be automated based on the score alone.

In any event, once the preferred layout is obtained, the processor uses this to generate the final output 150, which is then either stored in the memory 21, or output via the external interface 23 as required. Thus, in this instance the processing system 10 implements the publishing engine 140, and may also act as the content creation system 100 and the designer application 120.

Accordingly, it will be appreciated that the processing system may be any form of processing system suitably programmed to perform the analysis, as will be described in more detail below. The processing system may therefore be a suitably programmed computer, laptop, palm computer, or the like. Alternatively, specialised hardware or the like may be used.

However, alternative architectures, such as distributed architectures, or the like, may also be implemented.

Figure 15:
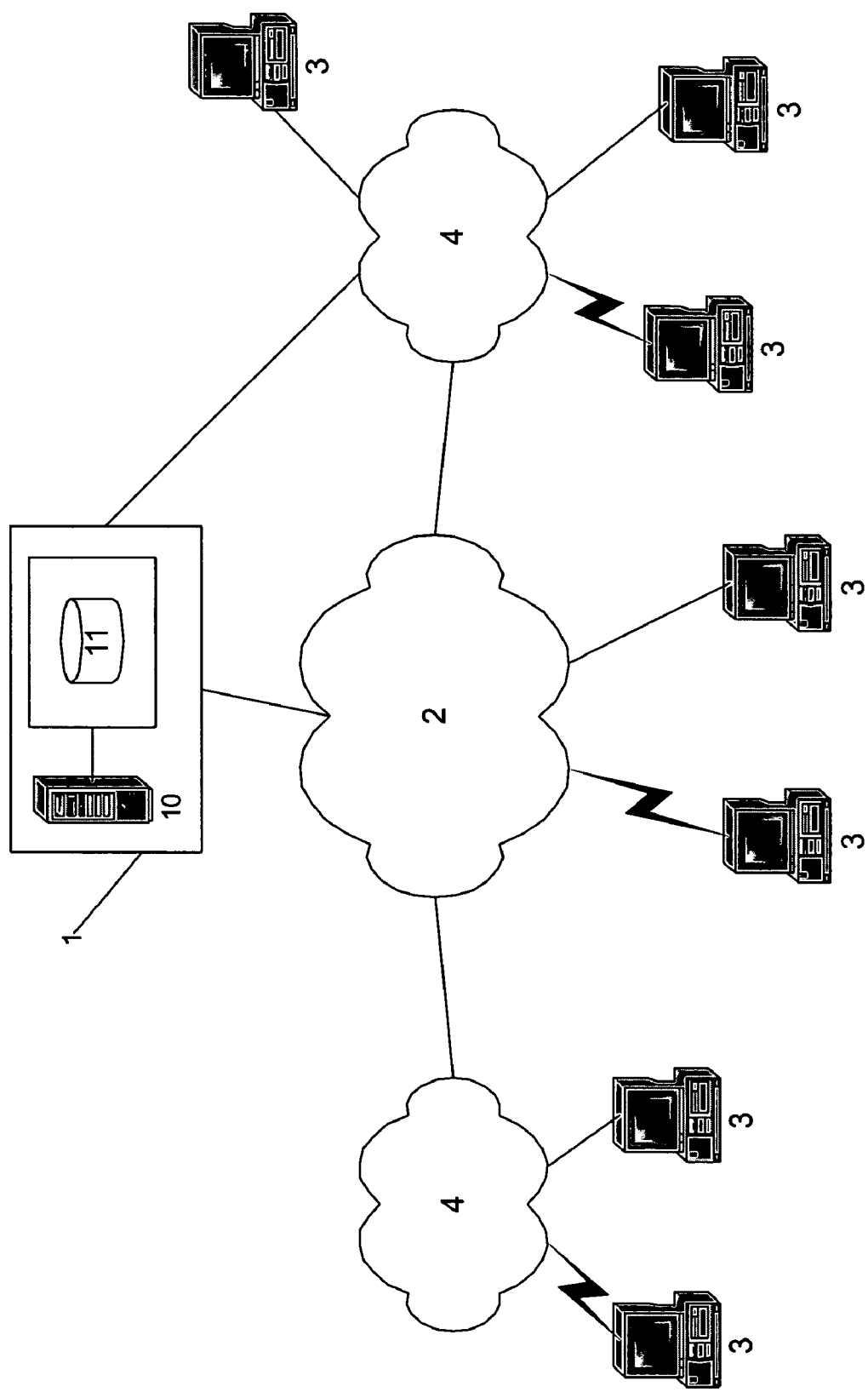
FIG. 15 is a schematic diagram is an alternative example of a system for implementing the invention; and, FIG. 16 is a schematic diagram of one of the end stations of FIG. 15.

An example of this is shown in FIG. 15 in which the processing system 10 is coupled to a database 11, provided at a base station 1. The base station 1 is coupled to a number of end stations 3 via a communications network 2, such as the Internet, and/or via communications networks 4, such as local area networks (LANs) 4. Thus it will be appreciated that the LANs 4 may form an internal network at a company or other organisation which provides content creation and/or design services.

Accordingly, in use the end stations 3 must be adapted to communicate with the processing system 10 positioned at the base station 1. It will be appreciated that this allows a number of different forms of end station 3 may be used.

Figure 16:
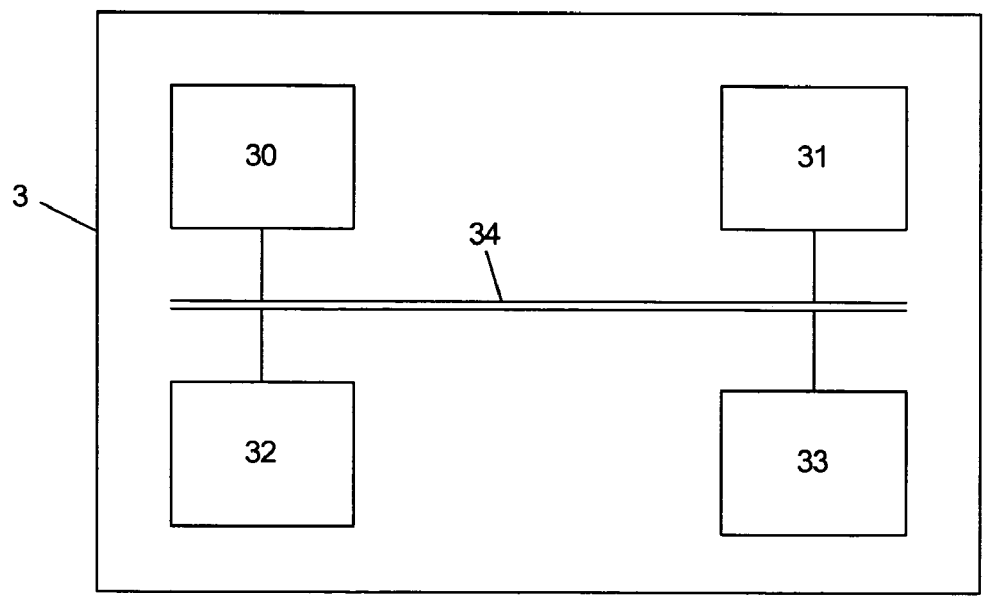

An example of a suitable end station is shown in FIG. 16. As shown the end station 3 includes a processor 30, a memory 31, an input/output device 32 such as a keyboard and display, and an external interface 33 coupled together via a bus 34, as shown. The internal interface 35 is typically provided to allow the end station 3 to be coupled to one of the communications networks 2, 4, and accordingly, this may be in the form of a network interface card, or the like.

In use, the processor 30 is adapted to communicate with the processing system 10 provided in the base station 1 via the communications networks 2, 4 to allow the above described process to be implemented. Accordingly, it will be appreciated that if the communications network 2 is the Internet, this may be achieved by having the base station 1 present web pages to the users of the end stations 3, allowing the users to submit the content and design data files 110, 130.

Accordingly, it will be appreciated that the end stations 3 may be formed from any suitable processing system, such as a suitably programmed PC, Internet terminal, lap-top, hand-held PC, or the like, which is typically operating applications software to enable data transfer and in some cases web-browsing.

In this case, the content provider and designer may be provided at respective ones of the end stations 3, with the designer and content provider operating independently to create the content and design data files 110, 130 as required. It will be appreciated that during this process details of the design may be forwarded to the content provider to allow this to be used in the generation of the content as described above. In any event, once completed the content and design data files 110, 130 can be submitted to the processing system 10, located at the base station 1. The processing system 10 then operates as described above, to generate the final output 150.

The final output can then be transferred to a respective one of the end stations 3, modified in situ, displayed as a web-page by the base station 1, or transferred elsewhere as required.

Thus, in one example, the processing system 10 implements the publishing engine 140, with the end stations 3 implementing the content creation systems 100 and the designer applications 120.

In this case, it will be appreciated that access to the process may be controlled using a subscription system or the like, which requires the payment of a fee to access the base station a web site hosting the process. This may be achieved using a password system or the like, as will be appreciated by persons skilled in the art.

In preferred embodiments of the present invention, the data are protected, for example, by known encryption techniques, before being sent from the end stations 3 to the base station 10. Likewise, the results produced by the base station 10 a preferably encrypted before being sent back to the end stations 3. In this manner, the privacy of content, designs and resulting layouts are maintained.

Furthermore, design files 130 may be stored in the database 11, allowing the files to be subsequently accessed and used in generating new output 150. This allows a content provider to commission a single design file 130, which is retained at the base station 1, and re-used for a variety of content data files 110 in future, as will be appreciated by persons skilled in the art.

In any event, regardless of the architecture used, the techniques described above allow content to be arranged within a defined space in accordance with design data. This may be achieved by having the processing system manipulate the content in accordance with the design data stored in the store to produce a number of different layouts. The layouts can then be automatically scored, allowing a preferred layout to be selected in accordance with a score. This process can be performed automatically, such that, for example, the layout with the highest score is selected. Alternatively, a number of layouts may be selected in accordance with the score, with the preferred layout being selected by a user in response to a visual assessment.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An iterative method of laying out elements in a defined space using content data and design data, said content data including alphanumeric and/or graphical elements and said design data including rules associated with one or more particular alphanumeric elements and/or graphical elements, said rules defining a scoring system which defines a score dependent on a degree of conformance to said rules, at least some of the rules being associated with a priority representing a positional requirement of the one or more particular alphanumeric elements and/or graphical elements, the method comprising, the steps of:
   a) arranging geometrically the alphanumeric and/or graphical elements included in the content data, the arrangement being performed within the defined space so as to obtain a resulting layout;
   b) scoring the resulting layout according to the rules included in the design data, wherein the score of the resulting layout is weighted according to the priority associated with the at least some of the rules;
   c) storing said score;
   d) repeating the above steps (a) to (c) to determine scores for a number of different resulting layouts and selecting one of the resulting layouts based upon the scores; and
   e) displaying the selected resulting layout.

2. A method according to claim 1, wherein the defined space is a page of a book.

3. A method according toe claim 1, wherein the defined space is displayed on a screen.

4. A method according to claim 1, wherein the method includes repeating steps (a) through (e) for a plurality of different defined spaces, thereby obtaining a plurality of selected resulting layouts which define a finished work.

5. A method according to claim 1, wherein step (b) includes scoring a high value for any of the particular alphanumeric element and/or graphical element having an optimal relative position in the defined space and scoring a low value for any of the particular alphanumeric element and/or graphical element having a poor relative position in the defined space.

6. A method according to claim 1, wherein arranging geometrically the alphanumeric and/or graphical elements comprises at least one of:
   a) positioning the alphanumeric and/or graphical elements within the defined space; and
   b) resizing the alphanumeric and/or graphical elements.

7. The method according to claim 1, wherein the alphanumeric and/or graphical elements include a first and second element having a spatial dependency defined therebetween, and wherein the method includes arranging the first element within the defined space, thereby causing an automatic arrangement of the second element within the defined space in accordance with the spatial dependency.

8. The method according to claim 1, wherein the method includes having a user define the priority associated with the at least some of the rules.

9. The method according to claim 1, wherein one of the rules is a positional rule that defines a desired distance between at least one of:
  a) two of the elements; and
  b) one of the elements and an edge of the defined space;
wherein the scoring for each resulting layout is based upon a conformance of the resulting layout with the desired distance of the positional rule.

10. The method according to claim 9, wherein the positional rule is one of the at least some of the rules, and wherein the method includes weighting the score of each resulting layout in accordance with an associated priority of the positional rule.

11. The method according to claim 9, wherein the method includes having a user define the desired distance for the positional rule.

12. A processing system for laying out elements in a defined space, the processing system comprising:
  a) a store for storing:
    i. content data including alphanumeric and/or graphical elements, and
    ii. design data including rules associated with one or more particular alphanumeric elements and/or graphical elements, said rules defining a scoring system which defines a score dependent on a degree of conformance to said rules, at least some of the rules being associated with a priority representing a positional requirement of the one or more particular alphanumeric elements and/or graphical elements;
  b) a processor adapted to:
    i. arrange geometrically the alphanumeric and/or graphical elements included in the content data to generate a layout, the arrangement being performed within the defined space so as to obtain a resulting layout;
    ii. score the resulting layout according to the rules included in the design data, wherein the score of the resulting layout is weighted according to the priority associated with the at least some of the rules;
    iii. store said score;
    iv. repeat the about steps (b)(i) to (b)(iii) to determine scores for a number of different resulting layouts and select one of the resulting layouts based upon the scores; and
    v. display the selected resulting layout.

13. The processing system according to claim 12, the processing system being adapted to determine the content and/or design data inserted into the resulting layouts based upon input commands received from a user.

14. The processing system according to claim 12, wherein the processing system includes a display for presenting layouts to a user.

15. The processing system according to claim 14, the processing system being adapted to:
  a) select one of the resulting layouts; and
  b) generate output data representing the selected resulting layout.

16. The processing system according to claim 15, the processing system being adapted to select the resulting layout based upon at least one of:
  a) input commands received from the user; and
  b) the scores of the resulting layouts.

17. The processing system according to claim 15 or claim 16, the processing system being coupled to a communications network, the processing system being adapted to:
  a) receive the content and/or design data from one or more end stations coupled to the communications network; and
  b) store the received content and/or design data in the store.

18. The processing system according to claim 15, the processing system being adapted to transfer the output data to a selected end station.

19. A method of laying out one or more elements in a defined space, the method comprising, the steps of:
  a) specifying which of the one or more elements will be inserted into the defined space and totaling the number of specified elements;
  b) collecting all rules associated with the specified elements and totaling the number of the collected rules, wherein the collected rules define desired arrangements of the specified elements in the defined space;
  c) determining all possible resulting layouts of the specified elements within the defined space, wherein the determination is based upon the number of specified elements and the number of collected rules;
  d) arranging the specified elements in the defined space according to the collected rules, thereby obtaining one of the resulting layouts;
  e) determining a score for the obtained resulting layout based upon a scoring methodology associated with the collected rules, wherein the score is based on the arrangement of the specified elements within the defined space;
  f) repeating the above steps (d) and (e) to arrange the specified elements in each of the possible resulting layouts and to determine a score for each obtained resulting layout;
  g) selecting one of the resulting layouts based upon the scores; and
  h) displaying the selected resulting layout.

20. A method according to claim 19, wherein arranging the elements comprises at least one of:
  a) positioning the elements within the defined space; and
  b) resizing the elements.

21. A method according to claim 19, wherein the defined space is a page of a book.

22. A method according to claim 19, wherein the defined space is a frame displayed on a screen.

23. The method according to claim 19, wherein the totaled number of collected rules is n, the totaled number of specified elements is m and the number of possible resulting layouts is $n^m$.

24. A processing system for laying out one or more elements in a defined space, the processing system being configured to:
  a) specify which of the one or more elements will be inserted into the defined space and total the number of specified elements;
  b) collect all rules associated with the specified elements and total the number of the collected rules, wherein the collected rules define desired arrangements of the specified elements in the defined space;

c) determine all possible resulting layouts of the specified elements within the defined space, wherein the determination is based upon the number of specified elements and the number of collected rules;

d) arrange the specified elements in the defined space according to the collected rules, thereby obtaining one of the resulting layouts;

e) determine a score for the obtained resulting layout based upon a scoring methodology associated with the collected rules, wherein the score is based on the arrangement of the specified elements within the defined space;

f) repeat the above steps (d) and (e) to arrange the specified elements in each of the possible resulting layouts and to determine a score for each obtained resulting layout;

g) select one of the resulting layouts based upon the scores; and h) display the selected resulting layout.

25. A processing system according to claim 24, wherein the processing system is configured to arrange the specified elements by performing at least one of:

a) positioning the specified elements within the defined space; and b) resizing the specified elements.

* * * * *